United States Patent
Oriet et al.

(10) Patent No.: US 8,253,260 B2
(45) Date of Patent: Aug. 28, 2012

(54) EXHAUST TURBINE GENERATOR SYSTEM AND METHOD OF CONTROLLING THE SAME

(75) Inventors: Leo P. Oriet, Rochester Hills, MI (US); Andre Bocancea, Windsor (CA); Colin J. Casey, Fort Wayne, IN (US)

(73) Assignee: Navistar Canada, Inc. (CA)

( * ) Notice: Subject to any disclaimer, the term of this patent is extended or adjusted under 35 U.S.C. 154(b) by 516 days.

(21) Appl. No.: 12/508,226

(22) Filed: Jul. 23, 2009

(65) Prior Publication Data

US 2011/0018267 A1  Jan. 27, 2011

(51) Int. Cl.
*F03B 13/00* (2006.01)
*F03B 13/10* (2006.01)
*H02P 9/04* (2006.01)
*F02D 31/00* (2006.01)
*F02D 35/00* (2006.01)
*F01D 15/10* (2006.01)
*F02C 6/00* (2006.01)
*H02K 7/18* (2006.01)

(52) U.S. Cl. ............... 290/43; 290/40 A; 290/52
(58) Field of Classification Search ............... 290/40 A, 290/43, 52
See application file for complete search history.

(56) References Cited

U.S. PATENT DOCUMENTS

| | | | | |
|---|---|---|---|---|
| 4,665,704 A * | 5/1987 | Hartwig | | 60/597 |
| 4,955,199 A | 9/1990 | Kawamura | | 60/608 |
| 5,088,286 A | 2/1992 | Muraji | | 60/608 |
| 5,105,624 A | 4/1992 | Kawamura | | 60/608 |
| 5,329,770 A * | 7/1994 | Ward | | 60/597 |
| 5,678,407 A | 10/1997 | Hara | | 60/608 |
| 5,893,423 A * | 4/1999 | Selfors et al. | | 180/65.245 |
| 5,906,098 A | 5/1999 | Woollenweber | | 60/608 |
| 6,012,289 A * | 1/2000 | Deckard et al. | | 60/608 |
| 6,125,625 A * | 10/2000 | Lipinski et al. | | 60/801 |
| 6,161,384 A * | 12/2000 | Reinbold et al. | | 60/602 |
| 6,205,957 B1 * | 3/2001 | Saylor | | 123/3 |
| 6,294,842 B1 * | 9/2001 | Skowronski | | 290/7 |
| 6,338,391 B1 * | 1/2002 | Severinsky et al. | | 180/65.23 |
| 6,564,784 B1 * | 5/2003 | Onodera et al. | | 123/568.12 |
| 6,604,360 B1 * | 8/2003 | Vuk | | 60/597 |
| 6,729,315 B2 * | 5/2004 | Onodera et al. | | 123/568.21 |
| 6,931,850 B2 | 8/2005 | Frank | | 60/608 |
| 7,047,743 B1 * | 5/2006 | Stahlhut et al. | | 60/608 |
| 7,174,714 B2 | 2/2007 | Algrain | | 60/608 |
| 7,336,000 B2 * | 2/2008 | Stahlhut et al. | | 290/52 |
| 7,382,061 B2 * | 6/2008 | Ferraro | | 290/52 |
| 7,597,164 B2 * | 10/2009 | Severinsky et al. | | 180/65.27 |
| 2003/0127079 A1 * | 7/2003 | Onodera et al. | | 123/568.21 |
| 2004/0200215 A1 * | 10/2004 | Woollenweber et al. | | 60/407 |
| 2006/0237246 A1 * | 10/2006 | Severinsky et al. | | 180/65.2 |
| 2007/0246942 A1 * | 10/2007 | Stahlhut et al. | | 290/40 A |
| 2011/0018339 A1 * | 1/2011 | Oriet et al. | | 307/9.1 |
| 2012/0117962 A1 * | 5/2012 | VanDyne et al. | | 60/600 |

* cited by examiner

*Primary Examiner* — Pedro J Cuevas
(74) *Attorney, Agent, or Firm* — Jeffrey P. Calfa; Mark C. Bach

(57) ABSTRACT

An exhaust gas turbine generator system for a vehicle that has an internal combustion engine with an exhaust system is provided. The exhaust system comprises a turbine, an electrical generator, a waste gate, and an electronic control module. The turbine is disposed in fluid communication with an exhaust gas system of an internal combustion engine to allow fluid flow between the turbine and the exhaust gas system. The electrical generator connects to the turbine. The waste gate is disposed in fluid communication with the exhaust gas system of the internal combustion engine. The waste gate is positionable between an open position and a closed position in response to an output signal from the electronic control module. The fluid flow in the exhaust gas system to the turbine is reduced when the waste gate is positioned to the open position.

14 Claims, 1 Drawing Sheet

EXHAUST TURBINE GENERATOR SYSTEM AND METHOD OF CONTROLLING THE SAME

TECHNICAL FIELD

This disclosure relates to an exhaust turbine generator system, such as for a vehicle, and more particularly to an exhaust turbine generator system for an on-highway truck and the exhaust turbine generator system includes a waste gate.

BACKGROUND

Many vehicles utilize hybrid drive technologies, in that a vehicle utilizes both an internal combustion engine and at least one electric motor to power the vehicle, and are often referred to as hybrid electric vehicles. In smaller vehicles, such as automobiles and light-duty trucks, an engine typically powers a generator to produce electrical energy for the at least one electric motor. In larger vehicles, such as heavy duty on-highway trucks, electrical energy may be produced utilizing a turbine disposed in fluid communication with engine exhaust, and the turbine being mechanically connected to a generator. For example, the turbine and the generator may reside on a common shaft. The generator generates electrical energy that may be used to power at least one electric motor that provides torque supplied to a transmission of the truck. The transmission of the truck also receives torque generated by the internal combustion engine to move the truck.

FIG. 1 schematically shows an existing hybrid electric vehicle 10. The hybrid electric vehicle 10 comprises an internal combustion engine 12, such as a diesel engine, and exhaust turbine and generator 14, a power distribution unit 16, electrical converter electronics 18, electric motor 20, and a transmission 22. The diesel engine 12 generates torque that is supplied to the transmission 22, and also generates exhaust gas that is utilized by the exhaust turbine and generator 14 to generate electrical energy. Electrical energy generated by the exhaust turbine and generator 14 is supplied to the power distribution unit 16, which allows electrical energy to be distributed to the electrical converter electronics 18, and the electric motor 20. The power distribution unit 16 additionally may direct electrical energy to a storage battery and resistor bank 24. The storage battery and resistor bank 24 receive power when the exhaust turbine and generator 14 is producing more electrical energy than is required by the electric motor 20, such as when motion of the vehicle is stopped, or the vehicle is coasting. However, the storage battery and resistor bank 24 add weight to the truck, therefore reducing by a same amount a quantity of cargo that may be legally hauled by the truck. Additionally, once the storage battery, or other electrical energy storing devices, is full, a resistor bank of the storage battery and resistor bank 24 is activated to use excess electrical energy. In situations where the resistor bank is activated, the resistors convert electrical energy to heat that is simply released to the atmosphere, thus, the electrical energy performs no useful work.

Therefore, a need exists for an exhaust turbine generator system that does not require storage of electrical energy.

SUMMARY

According to one embodiment, an exhaust gas system for a vehicle that has an internal combustion engine with an exhaust system is provided. The exhaust system comprises a turbine, an electrical generator, a waste gate, and an electronic control module. The turbine is disposed in fluid communication with an exhaust gas system of an internal combustion engine to allow fluid flow between the turbine and the exhaust gas system. The electrical generator connects to the turbine. The waste gate is disposed in fluid communication with the exhaust gas system of the internal combustion engine. The waste gate is positionable between an open position and a closed position in response to an output signal from the electronic control module. The fluid flow in the exhaust gas system to the turbine is reduced when the waste gate is positioned to the open position.

According to one process, a method of operating an exhaust gas turbine generator system for a vehicle having an internal combustion engine having an exhaust system is provided. An exhaust gas turbine generator system is provided in fluid communication with an exhaust system of an internal combustion engine. The exhaust gas turbine generator system has a turbine, a generator, a waste gate movable between an open position and a closed position, and an electronic control module. Electrical energy is generated with the exhaust gas turbine generator system. The method determines whether electrical demand for a vehicle is above a predetermined threshold. The waste gate is positioned in the open position when the electrical demand is less than the predetermined threshold. The waste gate positioned in the open position reduces fluid flow between the exhaust gas turbine generator system and the exhaust gas system, and reduces the generated electrical energy.

According to another embodiment, a hybrid electric vehicle comprises an internal combustion engine, an electric motor, a transmission, an exhaust gas turbine generator system, and an electronic control module. The internal combustion engine has a plurality of pistons, an exhaust system, and a first output shaft. The electric motor has a second output shaft. The transmission is coupled to the first output shaft of the internal combustion engine and the second output shaft of the electric motor. The exhaust gas turbine generator system has a turbine disposed in fluid communication with the exhaust system. An electrical generator is mechanically connected to the turbine. The exhaust gas turbine generator system further has a waste gate that has an open position and a closed position. The electronic control module monitors the electrical energy needs of the electric motor and the electrical energy output of the electrical generator. The waste gate is positioned to the open position when the electrical energy needs of the electric motor are less than the electrical energy output of the electrical generator.

DETAILED DESCRIPTION

Figure 1:
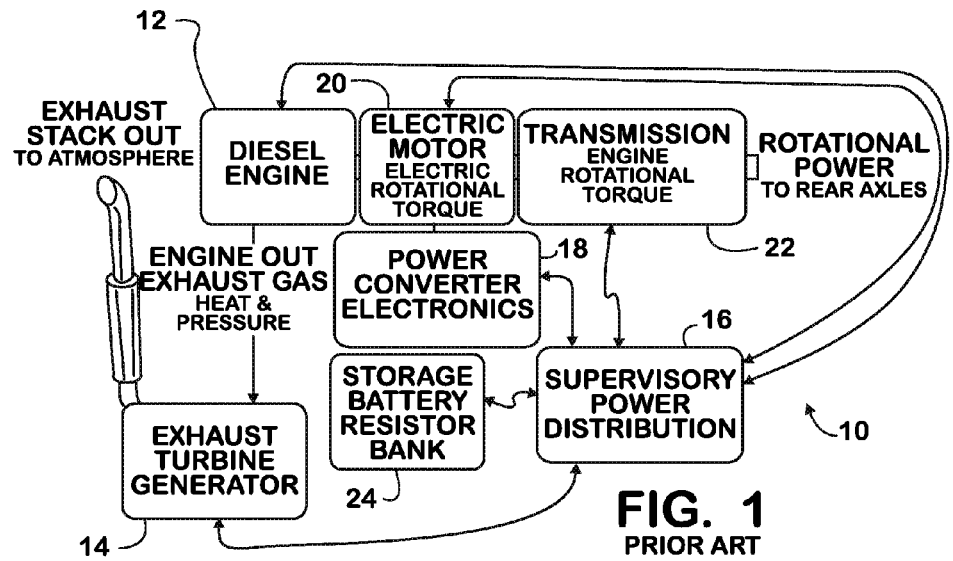
FIG. 1 is a schematic view of a prior art hybrid electric vehicle.
Figure 2:
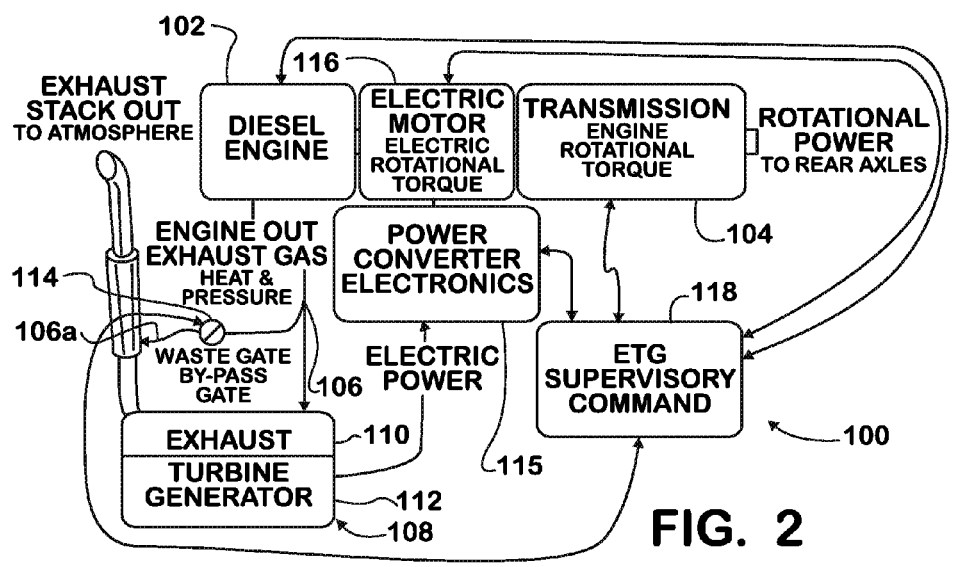
FIG. 2 is a schematic view of a hybrid electric vehicle.

FIG. 2 shows a schematic view of a hybrid electric vehicle 100. The hybrid electric vehicle comprises an internal combustion engine 102, such as a diesel engine. The diesel engine is mechanically connected to a transmission 104, such as via a first output shaft, in a manner that transfers torque from the engine 102 to the transmission 104. The hybrid electric vehicle 100 additionally has an exhaust system 106 that is disposed in fluid communication with the engine 102 and removes exhaust gases from the combustion process for the internal combustion engine 102.

An exhaust gas turbine generator 108 is disposed in fluid communication with the exhaust system 106. The exhaust gas turbine generator 108 has a turbine portion 110 and a generator portion 112. The turbine portion 110 of the exhaust gas turbine generator 108 is disposed in fluid communication with the exhaust system 106, and receives thermal energy from the exhaust system 106, and converts a portion of the thermal energy into mechanical energy. The generator portion 112 is connected to the turbine portion 110, such as being mounted on a common shaft. The generator portion 112 converts a portion of the mechanical energy of the turbine portion 110 into electrical energy.

In addition to the exhaust gas turbine generator 108, a waste gate 114 is disposed in fluid communication with the exhaust system 106. The waste gate 114 is disposed within a passageway 106*a* of the exhaust system 106 that bypasses the exhaust gas turbine generator 108. Thus, when the waste gate 114 is in a closed position, substantially all of the engine exhaust passes through the exhaust gas turbine generator 108, and when the waste gate 114 is in a fully open position, substantially all of the engine exhaust passes through the passageway 106*a*, bypassing the exhaust gas turbine generator 108. The waste gate 114 may be positioned between the open position and the closed position, thus allowing some exhaust to flow to the exhaust gas turbine generator 108.

Electrical energy generated by the generator portion 112 of the exhaust gas turbine generator 108 is provided to electrical converter electronics 115. The electrical converter electronics 115 regulate the voltage, or amperage, of the electrical energy generated by the exhaust gas turbine generator 108 such that the electrical energy may be utilized by an electric motor 116.

The electric motor 116 receives electrical energy from the electrical converter electronics 115. The electric motor 116 utilizes the electrical energy produced by the exhaust gas turbine generator 108 to produce torque that is supplied to the transmission 104. The electric motor 116 is mechanically connected to the transmission 104, such as via an output shaft, to provide torque from the electric motor 116 to the transmission 104.

The use of the electric motor 116 to provide torque to the transmission 104 allows the hybrid electric vehicle 100 to utilize less fuel than a conventional internal combustion only powered vehicle, as the engine 102 of the hybrid electric vehicle 100 may provide a lower power output, as the electric motor 116 supplies additional power to the transmission 104 to power the hybrid electric vehicle 100. Hence, the lower power output of the engine 102 requires less fuel. Additionally, it is contemplated that a smaller engine 102 may be used in the hybrid electric vehicle 100, as compared to a traditional vehicle, and the smaller engine 102 may weigh less and be more fuel efficient.

An electronic control module ("ECM") 118 is further provided with the hybrid electric vehicle 100. The electronic control module 118 is in electrical communication with the engine 102, the transmission 104, the waste gate 114, the electrical converter electronics 115, and the electric motor 116. The ECM 118 monitors the power required by the transmission 104 to move the vehicle 100. The ECM 118 controls the output of the electric motor 116, and the engine 102 so that the power required by the transmission 104 is provided, assuming the electric motor 116 and the engine 102 may produce sufficient torque required to the power the vehicle 100.

The ECM 118 additionally monitors the electrical energy required by the electric motor 116, and if the electric motor 116 does not require as much electrical energy as that being produced by the exhaust gas turbine generator 108, the ECM 118 may generate a signal that results in the waste gate 114 opening. As the waste gate 114 opens, exhaust gas from the engine 102 passes through the passageway 106*a* and bypasses the exhaust gas turbine generator 108. The reduction in exhaust gas supplied to the exhaust gas turbine generator 108 reduces the electrical energy produced by the generator portion 112. Thus, the more open the waste gate 114, the less electrical energy generated by the exhaust gas turbine generator 108. It is contemplated that when the waste gate 114 is in a fully open position, the exhaust gas turbine generator 108 will not generate electrical energy.

Thus, it is possible to control the waste gate 114 with the ECM 118 in a manner that allows the exhaust gas turbine generator 108 to produce electrical energy only when the electric motor 116 requires electrical energy. Therefore, the hybrid electric vehicle 100 does not require batteries, or a resistor bank to store or use excess electrical energy not required by the electric motor 116, as the waste gate 114 may be utilized to control the output of electrical energy of the exhaust gas turbine generator 108.

In addition to eliminating the need for batteries or a resistor bank, the waste gate 114 allows the exhaust gas turbine generator 108 to be sized for typical load levels, such as when the hybrid electric vehicle 100 is traveling in a steady state mode of operation, such as on a generally flat road at a generally constant speed. Such a design of the exhaust gas turbine generator 108 increases the efficiency of the production of electrical energy, and the waste gate 114 allows exhaust gas to bypass the exhaust gas turbine generator 108 when the engine 102 is operating at high power outputs, thereby reducing back pressure that may limit engine 102 performance.

The waste gate 114 additionally allows the hybrid electric vehicle 100 to operate even if a catastrophic failure occurs to the exhaust gas turbine generator 108. The waste gate 114 may be placed in a fully open position should the ECM 118 detect a failure, or malfunction, of the exhaust gas turbine generator 108, such as the exhaust gas turbine generator 108 is not producing electrical energy, overheats, structurally fails, or otherwise has an operating parameter that falls outside of a predetermined value. With the waste gate 114 in a fully open position, no exhaust gas passes through the exhaust gas turbine generator 108, and the engine 102 provides torque to the transmission 104 to move the vehicle 100.

Thus, the use of the waste gate 114 allows the exhaust gas turbine generator 108 of the hybrid electric vehicle 100 to produce electrical energy only when the electric motor 116 requires electrical energy. As such, the hybrid electric vehicle 100 does not require batteries or a resistor bank to store or dissipate excess electrical energy, as no excess electrical energy is produced. The elimination of batteries and a resistor bank reduces the cost of the hybrid electric vehicle, as well as the weight of the hybrid electric vehicle 100.

What is claimed is:

1. An exhaust gas turbine generator system for a vehicle having an internal combustion engine with an exhaust gas system, the exhaust gas system comprising:
    a turbine disposed in fluid communication with the exhaust gas system of the internal combustion engine;
    an electrical generator connected to the turbine;
    an electronic control module; and
    a waste gate disposed in fluid communication with the exhaust gas system of the internal combustion engine to allow fluid flow between the turbine and the exhaust gas system, the waste gate positionable between an open position and a closed position in response to an output signal from the electronic control module; and wherein fluid flow to the turbine is reduced when the waste gate is positioned to the open position, wherein the electrical generator produces no electrical energy when the waste gate is positioned to the open position.

2. The exhaust gas turbine generator system of claim 1, wherein the electrical generator is connected to the turbine by a shaft coupled to both the electrical generator and the turbine.

3. The exhaust gas turbine generator system of claim 1, wherein the electrical generator produces electrical energy proportional to position of the waste gate between the open position and the closed position of the waste gate.

4. The exhaust gas turbine generator system of claim 1 further comprising:
a passageway of the exhaust gas system that bypasses the turbine.

5. The exhaust gas turbine generator system of claim 4, wherein the waste gate is disposed in the passageway.

6. The exhaust gas turbine generator system of claim 1, wherein the electronic control module monitors electrical energy requirements of the vehicle.

7. The exhaust gas turbine generator system of claim 1, wherein the waste gate is positioned to the open position in response to the electronic control module detecting a malfunction with the exhaust gas turbine generator system.

8. The exhaust gas turbine generator system of claim 1, wherein fluid flow between the turbine and the exhaust gas system is increased when the waste gate is positioned to the closed position.

9. A method of operating an exhaust gas turbine generator system for a vehicle having an internal combustion engine having an exhaust system, the method comprising:
providing an exhaust gas turbine generator system in fluid communication with the exhaust system of the internal combustion engine, the exhaust gas turbine generator system having a turbine, a generator, a waste gate movable between an open position and a closed position, and an electronic control module;
generating electrical energy with the exhaust gas turbine generator system;
determining whether electrical demand for a vehicle is above a predetermined threshold; and
positioning the waste gate in the open position when the electrical demand is less than the predetermined threshold, wherein positioning the waste gate in the open position reduces fluid flow between the exhaust gas turbine generator system and the exhaust gas system, and reduces the generated electrical energy, wherein the electrical demand is determined based upon the electrical energy requirements of an electrical motor of the vehicle.

10. The method of claim 9, wherein the electrical demand is determined by the electronic control module.

11. The method of claim 9, wherein the positioning the waste gate in the open position allows a passageway of the exhaust gas system that bypasses the turbine to receive exhaust gas.

12. The method of claim 11, further comprising:
determining the exhaust gas turbine generator system is operating within at least one predetermined operating parameter; and
positioning the waste gate in the open position when the exhaust gas turbine generator system is not operating within the at least one predetermined operating parameter.

13. The method of claim 12, wherein determining whether the exhaust gas turbine generator system is operating within at least one predetermined operating parameter is determined by the electronic control module.

14. The method of claim 9 further comprising:
monitoring pressure within the exhaust system of the internal combustion engine;
determining whether the pressure within the exhaust system of the internal combustion engine exceeds a predefined threshold; and
positioning the waste gate in the open position when the pressure within the exhaust system of the internal combustion engine is above the predefined threshold.

* * * * *